Jan. 19, 1971 HIROYUKI CHIBA ET AL 3,557,266

METHOD OF ELIMINATING THE POROSITY AND CONTROLLING THE GRAIN SIZE OF A FERRITE BODY BY A TWO STAGE HOT PRESSING TREATMENT

Filed Feb. 9, 1967 2 Sheets-Sheet 1

INVENTORS
HIROYUKI CHIBA
YOSHIO TAWARA and
EIICHI HIROTA
BY Wenderoth, Lind & Ponack
ATTORNEYS INVENTORS
HIROYUKI CHIBA
YOSHIO TARAWA and
EIICHI HIROTA
BY Wenderoth, Lind & Ponack
ATTORNEYS United States Patent Office 3,557,266

Patented Jan. 19, 1971

3,557,266 METHOD OF ELIMINATING THE POROSITY AND CONTROLLING THE GRAIN SIZE OF A FERRITE BODY BY A TWO STAGE HOT PRESSING TREATMENT

Hiroyuki Chiba, Yoshio Tawara, and Eiichi Hirota, Osaka-fu, Japan, assignors to Matsushita Electric Industrial Co., Ltd., Osaka, Japan Filed Feb. 9, 1967, Ser. No. 614,889
Int. Cl. C04b *33/32, 35/26, 35/64*
U.S. Cl. 264—66 9 Claims

ABSTRACT OF THE DISCLOSURE

A ferrite having a porosity of less than 0.1% by volume and an average crystal grain size higher than 30 microns suitable for magnetic head cores is made by forming a cold pressed green ferrite body in a conventional manner, surrounding the body in a refractory powder in a hot press mold, heating to 1000–1250° C. without pressure, soaking for up to 5 hours and hot pressing during a portion of the soak period, releasing the pressure and heating to a higher temperature up to 1400° C. without pressure, soaking for up to 10 hours while hot pressing during a portion of this soak period and finally cooling the hot pressed ferrite to room temperature without pressure. Either an air atmosphere or partial vacuum is a suitable gaseous environment.

This invention relates to a method for making a magnetic head core for a video tape recorder and more particularly to a method for making a magnetic head core comprising hot-pressed ferrite.

A magnetic head for a video tape recorder has heretofore had a very short life and has had to be exchanged after every 100 to 200 hours of operation. In addition, the image reproduced by a video tape recorder has been inferior in sound-to-noise ratio (*S/N*) to the input image produced by a TV camera. The inferiority is mainly due to the magnetic head and to the tape. Therefore, many efforts have been aimed at the improvement of the magnetic head material and structure for obtaining an entirely satisfactory image reproduced by a video tape recorder.

A magnetic alloy such as Fe-Al or Fe-Al-Si having high permeability has been widely used heretofore as a magnetic head pole tip but has not been entirely satisfactory in the electro-magnetic properties of high frequency and in the operational life because it does not have a high electrical resistivity and a high mechanical hardness.

Ferrite has a high magnetic permeability and a high electrical resistivity and is in a high potential for use in a magnetic head core. Various attempts have been directed to the preparation of a magnetic head core comprising a ferrite in a sintered form or in a single crystal form. The ferrite in a sintered form is usually prepared by a so-called sintering method comprising a heating process without pressure or by a so-called hot-pressing method comprising a hot-pressing process. The ferrite prepared by the sintering process is apt to have a high porosity. The hot-pressing process makes a ferrite having a small adverage grain size and a low porosity. Therefore, it has been difficult to control both the porosity and the average grain size of ferrite by employing, as a single operation, either the sintering process or the hot-pressing process. The magnetic head core requires a head gap of an order of about 1$\mu$ and a high mechanical strength which results in a long operational life of the magnetic head. This entails controlling both the average grain size and the porosity of the sintered ferrite.

A ferrite in a single crystal form has a high potential for use in a magnetic head core because it is of no porosity and because of its single grain form. However, it is difficult to manufacture, in a high production yield and in a low cost, the single crystal of ferrite having a desired composition distributed uniformly throughout the crystal and being of a size sufficiently large for making a magnetic head. A single crystal of ferrite is usually hard but is brittle. The brittleness prevents the single crystal of ferrite from being easily shaped to a magnetic head pole tip by simple machine work, and also causes damage due to high running speed of the tape.

A magnetic head core according to a conventional method is formed by adhering a pole tip made of a single crystal ferrite or aforesaid magnetic alloy to a yoke comprising a sintered ferrite. Such a form requires additional complicated processes.

An object of the invention is to provide a method for making a magnetic head core having improved electrical and magnetic properties at high frequencies.

A further object of the invention is to provide a method for making a magnetic head core having a long operational life.

Another object of the invention is to provide a method for making a magnetic head core with a pole tip and a yoke in a single body.

These and other objects will be apparent upon consideration of the following description taken together with the accompanying drawings wherein.

Figure 1:
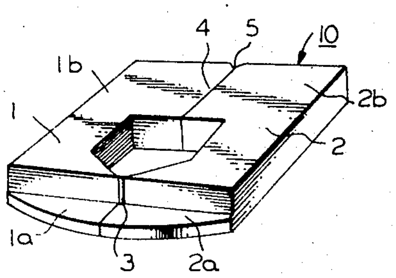
FIG. 1 is a perspective view of a magnetic head core comprising two hot-pressed ferrite elements according to the invention.

Before proceeding with a detailed description of the novel method for making a magnetic head core comprising a hot-pressed ferrite according to the invention, the construction of the magnetic head core will be explained with reference to FIGS. 1, 2 and 3 of the drawings wherein reference character 10 designates, as a whole, a magnetic head core comprising two elements 1 and 2 of hot-pressed body of ferrite. The two elements 1 and 2 comprise yokes 1*b* and 2*b* in a thickness of 0.3 to 1.0 mm. and are joined together by using glass spacers 3 and 4. Pole tips 1*a* and 2*a* have a thickness approximately equal to the track width of conventional tape. The width of said glass spacers 3 is from 0.1 to 1.0μ. A notch 5 is used for holding a glass fiber which is infiltrated into a gap between the two elements 1 and 2 during the heating process for melting the glass.

The novel method for making the magnetic head core 10 according to the invention can be accomplished in four steps, i.e. (1) preparation of a process hot-pressed body of ferrite composition, (2) shaping of said hot-pressed body into a bar having specified configuration, (3) joining two of said bars, and (4) a cutting process for slicing said joined bar into magnetic head cores having a desirable thickness and a specified cross-sectional shape, as set forth hereinafter.

The preparation process comprises heating initially a cold-pressed body of a ferrite composition in a die up to a temperature higher than 1000° C., holding said cold-pressed body at the said temperature for a time period longer than 30 minutes while pressing said cold-pressed body for a time period longer than 10 minutes so as to form a sintered body having a high density, heating said sintered body up to a temperature higher than the initial heating temperature without pressure, holding said sintered body at the higher temperature for a time period longer than 30 minutes while pressing said sintered body for a time period longer than 10 minutes so as to increase the grain size of said sintered body and then furnace-cooling said sintered body to room temperature (about 25° to about 35° C.) without pressure.

Figure 7:
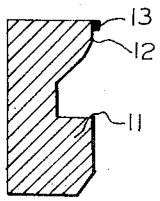
FIG. 7 is a cross-sectional view of a shaped bar illustrated in FIG. 6.

In the shaping process, said resulting sintered body is cut into a bar having a cross-sectional shape defined by FIG. 7. The tip face is polished initially with a lapping agent such as $Cr_2O_3$ and then finally with a diamond paste.

The top part of said bar is partially coated with a titanium evaporation film of a thickness of 0.1 to 1.0μ. Two thus-produced bars, one of which is not provided with the said evaporation film, are joined at the polished surfaces by using a holding tool. Said titanium evaporation film keeps easily the tip gap at 0.1 to 1.0μ, when the two bars are joined. A glass fiber of 0.1 to 0.4 mm. diameter is placed on the hollow 5 and in the interior of the tip gap (cf. FIG. 8). The joined bars with glass fibers are heated in a non-oxidizing atmosphere such as $N_2$ gas at a temperature which makes it possible for the glass fibers to melt and to penetrate into the tip gap and into the bottom joint space, and are then furnace-cooled to room temperature so as to form an adhered head core having a tip gap of 0.1 to 1.0μ. The adhered bar is lapped and polished at the top surface of tip to remove the said evaporated titanium film therefrom.

Figure 2:
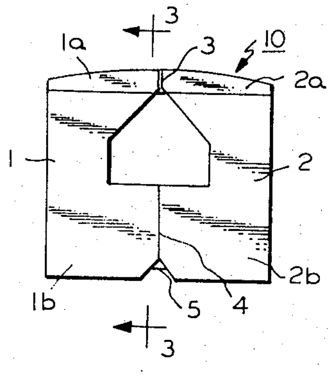
FIG. 2 is a front view of the magnetic head core illustrated in FIG. 1.
Figure 3:
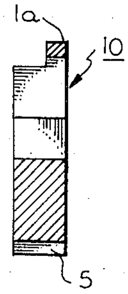
FIG. 3 is a cross-sectional view of the magnetic core head illustrated in FIG. 1, which is taken along the opposed abutting surfaces of the elements, i.e. along line 3—3.

The resultant adhered bar is cut into a magnetic head core having the aforesaid thickness and the cross-sectional shape defined by FIGS. 1 to 3 by using a conventional and suitable cutting tool, such as a diamond wheel.

Any ferrite composition having a high magnetic permeability and a high maximum magnetic induction Bm is operable. Operable ferrite compositions are Ni-Zn ferrite, Mn-Zn ferrite, Li-Zn ferrite, Cu-Zn ferrite, Mg-Zn ferrite, and Y-iron garnet ($Y_3Fe_5O_{12}$). Perferable ferrite compositions are listed in Table 1 wherein compositions are shown in mole percent:

TABLE 1

| | |
|---|---|
| Mn-Zn ferrite: | |
| MnO | 15–50 |
| ZnO | 0–25 |
| $Fe_2O_3$ | 48–65 |
| Ni-Zn ferrite: | |
| NiO | 10–25 |
| ZnO | 10–30 |
| $Fe_2O_3$ | 48–58 |

It has been discovered according to the invention that a magnetic head core of superior high frequency electrical properties and of superior operational life can be prepared by employing a ferrite having both a porosity less than 0.1% by volume and an average grain size higher than 30μ.

It has been difficult to prepare the ferrite having both a porosity less than 0.1% by volume and an average grain size higher than 30μ by employing a single hot-pressing operation. A single hot-pressing operation at a low temperature of 800° C. to 1250° C. results in a high density but in a small average grain size. A single hot-pressing operation at a high temperature of 1250° C. to 1400° C. results in a large average grain size but in a low density which is due to a difficulty in removing gas previously included in the cold-pressed body.

It has been discovered according to the invention that a ferrite having both a porosity less than 0.1% by volume and an average grain size higher than 30μ can be obtained by employing a combination of hot-pressing and heating without pressure.

Figure 4:
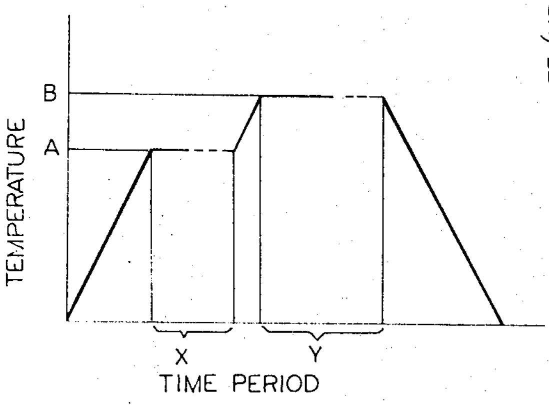
FIG. 4 is a graphic representation of the heating schedule for making a sintered ferrite in accordance with the invention.

Referring to FIG. 4, a dotted line indicates a time period at which a pressure is applied to the ferrite composition. A cold-pressed body of a given ferrite composition is heated up to a temperature A of 1100° to 1250° C. and is held at this temperature for a time period X of 30 minutes to 5 hours so as to form a sintered body of ferrite. During said time period X, the ferrite composition is hot-pressed at a pressure higher than 50 kg./cm.$^2$ (kilograms per square centimeter) for a time period of 10 minutes to 2 hours. The time period of hot-pressing can be positioned at any desirable time of the time period X. A preferable time period of hot-pressing is positioned at the final step of the time period X as shown in FIG. 4 because gas such as air included in the cold-pressed body easily comes out during heating without pressure.

When the cold-pressed body is treated with only hot-pressing during the time period X, the sintered body of ferrite is apt to comprise a phase of $\alpha$-$Fe_2O_3$ which impairs the magnetic properties of the resultant sintered body of ferrite. The temperature A is a temperature at which the sintered ferrite does not show a remarkable grain growth even when heated for a long period higher than 5 hours. Therefore, the sintered body obtained at the time period X has a high density due to the hot-pressing operation but has a small grain size less than 5μ.

The so-produced sintered body is subsequently heated up to a temperature B of 1250° to 1400° C. and is held at this temperature for a time period Y of 30 minutes to 10 hours. During the period Y, the sintered body is pressed at a pressure higher than 50 kg./cm.$^2$ for a time period of 10 minutes to 3 hours. The hot-pressing can be applied at any desirable time and is applied preferably at the final period of time period Y. Theheat-treatment at the time period Y is effective for obtaining a large grain size higher than 30μ.

Following the time period Y, the sintered body is furnace-cooled without pressure to room temperature.

Figure 5:
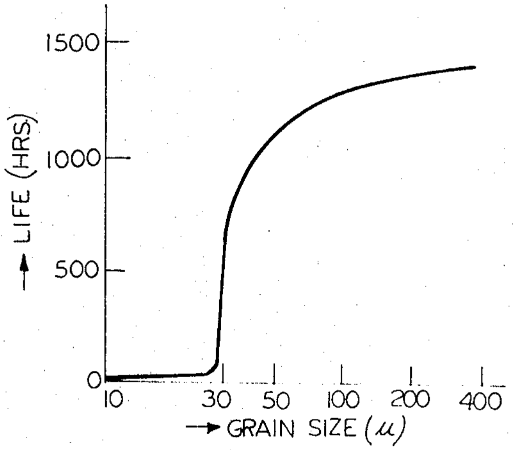
FIG. 5 is a graph illustrating the operation life versus the average grain size of said sintered ferrite.
Figure 6:
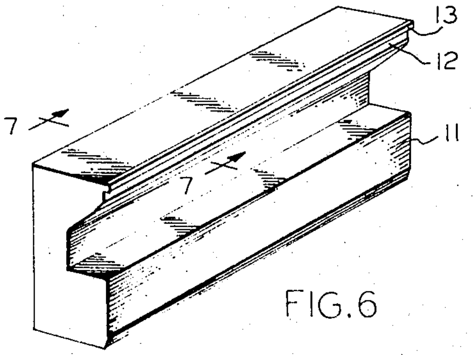
FIG. 6 is a perspective view of a shaped bar comprising a hot-pressed ferrite according to the invention.

FIG. 5 wherein operational life is defined by a time period in hours, during which an output voltage of a magnetic head is lowered by 3 db, makes clear that a ferrite having an average grain size higher than 30μ can insure an operational life longer than 500 hours. Preferable average grain size is a size higher than 50μ. The average grain size is determined by calculating a number of grains at a given area of microscopic photograph in a given magnification in association with a method defined at pages 1690 to 1693 of the 1955 Book of ASTM, i.e. E 89–52.

A mixture of a ferrite composition mentioned above is calcined at a temperature of 800° to 1100° C. and is pressed, with or without any binder material, at room temperature to any desired shape in a per se well known ceramic fabrication technique. A cold-pressed body so produced is placed in a die made of any refractory material while being embedded with a powder of refractory material and is heated in a vertical type electric furnace. An upper punch can supply a presure to the cold-pressed body through the embedding power by using a conventional pressing machine.

It is important that the embedding powder does not react with the ferrite composition and does not adhere to the ferrite body during a heat-treatment. It has been discovered according to the invention that an operable powder is of $Al_2O_3$ which is made of molten $Al_2O_3$ having a purity higher than 99% by weight and has an average grain size of 60 to 300$\mu$.

Operable materials for a die and a punch are any refractory material having a high mechanical strength at the high temperature of hot-pressing and a high resistance to oxidation and to reaction with the $Al_2O_3$.

Preferable materials are silicon carbide and silicon nitride. A conventional graphite is not suitable for hot-pressing ferrite composition because the graphite produces carbon monoxide which easily reduces the ferrite compositions.

The novel heat-treatment for making a hot-pressed body of ferrite composition according to the invention can be carried out in air. A preferable heating atmosphere is a reduced pressure of air lower than 100 mm. Hg. The reduced pressure tends to make the heating apparatus complicated but has a great effect to reduce the porosity of the resultant sintered body of ferrite composition.

The resultant sintered body is cut to a bar having, for example, a 2.3 mm. thickness, a 5 mm. width and a 35 mm. length. The bar is lapped by a conventional lapping agent such as $Cr_2O_3$ and is shaped to a bar having a cross-sectional view defined by FIG. 7 in a per se well known technique. After shaping, the bar is polished at surfaces 11 and 12 of two projected parts by a diamond polishing paste. Two of the so-produced bars are joined together at the surfaces 11 and 12 by using a per se conventional holding tool. One of the two is partially coated at the surface 12 with a vacuum evaporation metal film 13 of a 0.1 to 1.0$\mu$ thickness and about 150$\mu$ width in a per se conventional manner. The coated film assures a head-gap of 0.1 to 1.0$\mu$ when the two bars are joined. The evaporation film can be made of any suitable metal, such as titanium.

Figures 8, 9:
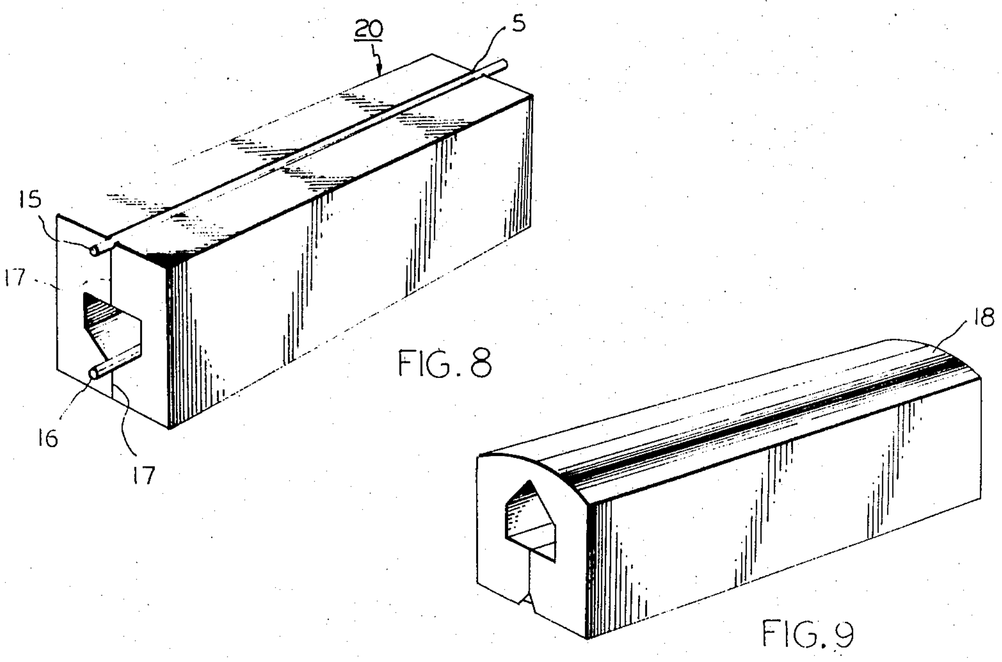
FIG. 8 is a perspective view of a joined bar which is provided with glass fibers.
FIG. 9 is a perspective view of an adhered bar which is polished at the pole tip surface.

Referring to FIG. 8, the joined bar 20 is placed in a furnace in such a way that the hollow or notch 5 is positioned upward. Two glass fibers 15 and 16 are put on the notch 5 and at the interior of the tip-gap. The joined bar 20 provided with the glass fibers 15 and 16 is heated in a non-oxidizing atmosphere, such as nitrogen, up to a temperature at which the glass fibers 15 and 16 melt and infiltrate into the gap 17 between the two bars, and are then furnace-cooled to room temperature. A non-oxidizing atmosphere is important for preventing the segregation of $\alpha$-$Fe_2O_3$ segregates in the sintered ferrite body when the sintered body of ferrite is heated in air at a temperature of 500° C. to 900° C. while contacting with the molten glass. The segregated $\alpha$-$Fe_2O_3$ impairs the magnetic properties of the ferrite. It has been discovered according to the invention that the non-oxidizing atmosphere during melting the glass fiber has a great effect to suppress the undesired segregation of $\alpha$-$Fe_2O_3$.

A glass fiber composition also has a great effect on the operational life of the resultant magnetic head. Necessary properties of the glass composition are a mechanical hardness approximately equal to that of the sintered ferrite, an excellent adhesion between the two bars, and a melting point below 900° C.

An operable glass composition is a composition having a mechanical hardness in a Vickers' scale differing from that of a ferrite by less than ±30%. A superior magnetic head core can be prepared by employing a glass composition having a Vickers' hardness differing from that of the ferrite by less than ±15%. The ferrite compositions listed in Table 1 can form an excellent magnetic head core when combined with the glass compositions listed in Table 2 wherein compositions are expressed in weight percent:

TABLE 2

| | Examples | | |
|---|---|---|---|
| | A | B | C |
| Ingredients and properties: | | | |
| $SiO_2$ | 22.5 | 56.2 | 70.9 |
| $Na_2O$ | 21.0 | 7.6 | 16.4 |
| $K_2O$ | | 4.5 | 1.0 |
| PbO | | 30.0 | |
| $Al_2O_3$ | | 1.2 | 0.5 |
| $Sb_2O_3$ | | 0.3 | 0.3 |
| MnO | | 0.2 | |
| CaO | | | 5.0 |
| BaO | | | 2.0 |
| MgO | | | 3.9 |
| $B_2O_3$ | 56.5 | | |
| Softening temperature, ° C | 500 | 620 | 675 |
| Linear expansion coefficient $\times 10^{-7}$ | 77 | 95 | 105 |
| Vickers' hardness | 510 | 540 | 550 |

The Mn-Zn ferrite and Ni-Zn ferrite according to the invention have approximately, as an average value, a linear thermal expansion coefficient of $90 \times 10^{-7}$ and $96 \times 10^{-7}$ and a Vickers' hardness of 600 and 630, respectively. The glass compositions listed in Table 2 have a Vickers' hardness differing by less than ±30% from those of the Mn-Zn ferrite and Ni-Zn ferrite and can make a magnetic head core having a superior operational life. Thermal expansion coefficient of the glass composition does not have a critical effect on the operational life.

For example, a glass composition consisting of 2.6 wt. percent of $SiO_2$, 80 wt. percent of PbO, 1.0 wt. percent of $Al_2O_3$, 8.8 wt. percent of ZnO and 7.6 wt. percent of $B_2O_3$ has a linear thermal expansion coefficient of $95 \times 10^{-7}$ which is close to those of the above ferrites and a Vickers' hardness of 300 which is greatly lower than those of the above ferrites and cannot make a magnetic head core having a superior operational life.

Figure 10:
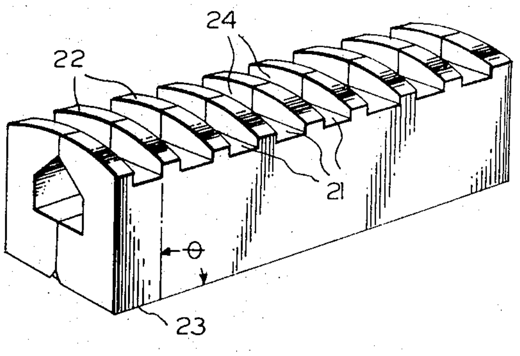
FIG. 10 is a perspective view of a grooved bar.

The adhered bars 20 are lapped and polished at the surface 18 of the tip for removing the part having the vacuum evaporation film and for forming a curvature at the surface as shown in FIG. 9, by a per se well known method. The polished bar of FIG. 9 is grooved at the polished tip surface 18 as shown in FIG. 10, by using a diamond wheel cutter. Each groove 21 has a width of, for example, about 0.6 mm. and a depth of, for example, about 0.5 mm. Each hill 22 between the grooves has a width of about 0.35 mm. which is approximately equal to the sum of track width of a tape and width of the diamond wheel which is used for slicing in a way set forth hereinafter. An important feature is that the grooves are prepared in a way that an angle $\theta$ between a side wall 24 of the groove and the bottom surface 23 is essentially 90°.

The grooved bar is sliced into a magnetic head core having a thickness of about 1 mm. by a diamond wheel cutter in a per se conventional slicing method. The so produced magnetic head core is polished at a surface shown by the arrow in FIG. 3.

Such a shape of pole tip as defined by FIG. 3 in accordance with the invention has an advantage that the invention has an advantage that the thickness of the pole tip 1$a$ and 2$a$ does not vary with decrease in the height of the pole tip during operation. In addition the novel shape makes it possible to increase the mechanical strength of the yoke 1$b$ and 2$b$ and to reduce the reluctance of the yoke 1$b$ and 2$b$. Another advantage is that the magnetic head core can be easily prepared by a simple machine operation, which results in a low cost.

A magnetic head core prepared by the novel hot-pressing method according to the invention can form a superior magnetic head which has an optimum recording current less than half of that of a conventional magnetic head core comprising, for example, a core made of a magnetic alloy, such as Sendust.

The following are non-imitative illustrative examples of presently preferred embodiments of the invention:

EXAMPLE 1

A mixture of 32 mole percent of MnO, 16 mole percent ZnO and 52 mole percent $Fe_2O_3$ is calcined at 1100° C. for 2 hours, ground into a finely divided powder and pressed into a disk of 36 mm. in diameter and 5 mm. in height at a pressure of 300 kg./cm.$^2$. The pressed body is inserted in a die made of silicon nitride while being embedded in melted alumina powder having an average particle size of 80$\mu$ and is then heated in an electrical furnace provided with a pressing machine to 1200° C. within 1 hour in air. The pressed body is held at this temperature for 1 hour while being hot-pressed by a pressure of 250 kg./cm.$^2$ for 30 minutes at a final period of the 1200° C. heating period so as to form a sintered ferrite. The sintered ferrite is subsequently heated to 1350° C. without presure within 10 minutes and is held at this temperature for 4 hours while being hot-pressed by a pressure of 250 kg./cm.$^2$ for the final 30 minutes of the 1350° C. heating period.

Finally, the sintered body is furnace-cooled to room temperature without pressure. The resultant sintered body having a porosity less than 0.1% by volume and an average grain size of about 200$\mu$ is shaped, in a manner similar to that of the above description, to a bar having a cross-sectional view according to FIG. 7.

One of the so-produed bars is coated with a titanium evaporation film in a manner similar to the above description and is joined to another such bar having no evaporation film by using a per se conventional tool. Two glass fibers of a composition consisting of 22.5 mole percent of $SiO_2$, 21 mole percent of $Na_2O$ and 56.5 mole percent of $B_2O_3$ are attached to the joined bars in a similar way to that of the above description. The joined bars provided with two glass fibers are heated in nitrogen gas at 750° C. for 10 minutes and then furnace-cooled to room temperature.

Figure 11:
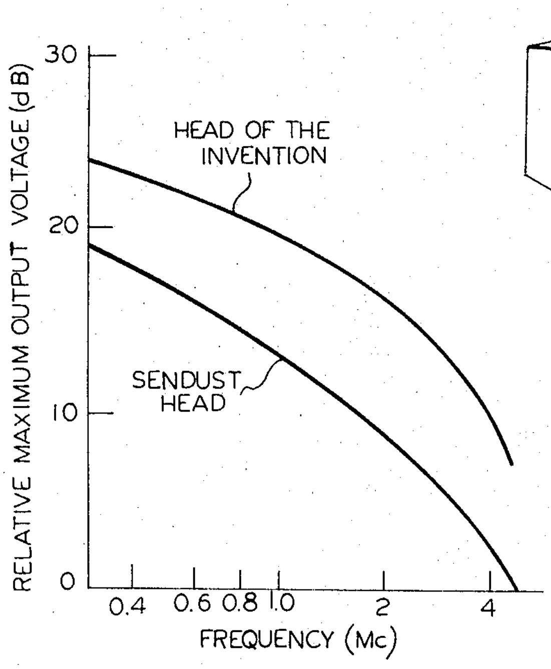
FIG. 11 is a graph illustrating the frequency versus the relative maximum output voltage of the magnetic head prepared by a method according to the invention with reference to the frequency characteristics of a conventional magnetic head core comprising a magnetic alloy of Sendust.

The adhered bars are sliced into a magnetic head core in a manner similar to that of the above description after being grooved and polished. A magnetic head comprising the so-produced magnetic head core has a maximum reproducing output voltage of 3.5 mv. at a frequency of 4 mc. and at a tape speed of 20 meters/second. FIG. 11 shows that the novel magnetic head core is superior in frequency vs. relative maximum output voltage to the conventional magnetic head core comprising a conventional magnetic alloy, such as Sendust consisting of Fe-Al-Si. The magnetic head core so produced has a superior operating life such that the initial maximum output voltage of 3.5 mv. does not change within 100 hours of operation at a frequency of 4 mc. and at a tape speed rate of 20 meters/second and decreases only by less than 0.5 mv. after 1000 hours of operation.

EXAMPLE 2

A mixture of 50 mole percent of $Fe_2O_3$, 35 mole percent of NiO and 15 mole percent of ZnO is fabricated into a resultant sintered body in a similar way to that of Example 1 except for the initial heating temperature. In this Example 2, the initial heating temperature is 1250° C. The resultant sintered body has a porosity less than 0.1 percent by volume and an average grain size of 100$\mu$.

The fabrication for a magnetic head core is also effected in a similar way to that of Example 1 except for the glass composition. Glass fibers consisting of a composition defined by Example B in Table 2 are infiltrated into the head gap by heating in nitrogen gas at 900° C. for 10 minutes.

A magnetic head comprising the so-produced magnetic head core has a maximum reproducing output voltage of 4.0 mv. at a frequency of 2.7 mc. and at a tape speed of 12 meters/second. The initial maximum reproducing out-put voltage of 4.0 mv. decreases only by less than 0.2 mv. after 1000 hours of operation.

Having thus disclosed the invention, what is claimed is:

1. In a method of making a magnetic head core consisting of the step of cold-pressing a powder mixture in a ferrite composition into the desired shape, sintering the cold pressed body to form a strong ferrite body, shaping said resultant ferrite body into a bar of desired cross section, joining two of said bars with interposition of a glass spacer, heating the joined bars to form a glass bond between the bars grooving and polishing the joined bars, and slicing the joined bars into magnetic head core form; wherein the improvement comprises replacing said sintering step with the steps of:

(a) surrounding the cold pressed body with a refractory powder in a die made of a refractory material, (b) heating this cold pressed body to a temperature in the range of 1000° to 1250° C., (c) holding the cold pressed body at the temperature of step (b), for a period of 30 minutes to 5 hours and applying a mechanical pressure higher than 50 kg./cm.$^2$ on said cold pressed body for a period of 10 minutes to 2 hours during the holding period at the temperature of step (b), (d) further heating said cold pressed body to a temperature higher than the initial heating temperature and lower than 1400° C. without pressure, (e) holding said cold pressed body at the temperature of step (d) for a period of 30 minutes to 10 hours and applying a mechanical pressurer higher than 50 kg./cm.$^2$ on said cold pressed body for a period of 10 minutes to 3 hours during the holding period of the temperature of step (d) to increase the grain size of above 30 microns in the dense-sintered ferrite body, (f) cooling said cold pressed body to room temperature without pressure.

2. The improvement in making a magnetic head core comprising a hot-pressed ferrite, according to claim 1, wherein said cold-pressed body of a ferrite composition is inserted in a die made of one element selected from the group consisting of silicon nitride and silicon carbide while being embedded in alumina powder.

3. The improvement in making a magnetic head core comprising a hot-pressed ferrite, according to claim 1, wherein said initial and subsequent holdings and hot-pressings are carried out at a reduced air pressure lower than atmospheric pressure and below 100 mm. Hg.

4. The improvement in making a magnetic head core comprising a hot-pressed ferrite, according to claim 1, wherein said ferrite composition comprises 15 to 50 mole percent of MnO, 0 to 25 mole percent of ZnO and 48 to 65 mole percent of $Fe_2O_3$.

5. The improvement in making a magnetic head core comprising a hot-pressed ferrite, according to claim 1, wherein said ferrite composition comprises 10 to 25 mole percent of NiO, 10 to 30 mole percent of ZnO and 48 to 58 mole percent of $Fe_2O_3$.

6. The improvement in making a magnetic head core comprising a hot-pressed ferrite, according to claim 1, wherein said glass spacer has a mechanical hardness differing by less than $\pm$15% from that of the dense sintered ferrite composition.

7. The improvement in making a magnetic head core comprising a hot-pressed ferrite, according to claim 1, wherein said glass spacer is prepared by heating a glass composition in a non-oxidizing atmosphere.

8. The improvement in making a magnetic head core comprising a hot-pressed ferrite, defined in claim 1, wherein said magnetic head core has a shape such that a tip is in a side sectional view of a rectangular form having a thickness which is approximately equal to a track width and which is thinner than that of a yoke.

9. In the method of making a magnetic head core consisting of the steps of calcining a mixture of 35 mol percent NiO, 15 mol percent ZnO and 50 mol percent $Fe_2O_3$ to form a ferrite structure, grinding said ferrite to a finely divided powder, cold pressing said powder into the desired shape, sintering said shape to form a strong ferrite body, shaping said resultant ferrite body into a bar of desired cross-section, joining two of said bars with interposition of a glass spacer, heating the joined bars to form a glass bond between the bars, grooving and polishing the joined bars, and slicing the joined bars into magnetic head core form; wherein the improvement comprises replacing said sintering step with the steps of;

(A) surrounding the cold pressed shape with fused alumina powder having a purity of at least 99% $Al_2O_3$ and an average particle size of 60–300 microns in a die punch assembly made from a material selected from the group consisting of silicon nitride or silicon carbide, (B) heating this assembly to a temperature in the range of 1100 to 1250° C.;

(C) holding said assembly at the temperature of step (B) for a period of 30 minutes to 5 hours and applying a pressure higher than 50 kg./cm.$^2$ on said cold pressed shape and said alumina powder for a period of 10 minutes to 2 hours during the holding period at the temperature of step (B) to sinter and render dense a cold pressed shape, (D) further heating said assembly to a temperature in the range of 1250° C. to 1400° C., without pressure, (E) holding said assembly at temperature of step (D) for a period of 30 minutes to 10 hours and applying a pressure higher than 50 kg./cm.$^2$ on said cold pressed shape and said alumina powder for a period of 10 minutes to 3 hours during the holding period of the temperature of step (D) to increase the grain size above 30 microns in the dense sintered ferrite body, (F) cooling said assembly to room temperature without pressure and removing the dense-sintered ferrite body from said assembly and said alumina powder.

References Cited

UNITED STATES PATENTS

| | | | |
|---|---|---|---|
| 2,956,327 | 10/1960 | Borel et al. | 264—332 |
| 2,990,602 | 7/1961 | Brandmayr et al. | 264—332 |
| 3,074,888 | 1/1963 | Carter | 264—66 |
| 3,177,475 | 4/1965 | Bos et al. | 179—100.2C |
| 3,246,383 | 4/1966 | Peloschek et al. | 179—100.2C |
| 3,343,915 | 9/1967 | Rossi et al. | 264—332 |
| 3,344,073 | 9/1967 | Bratschun | 252—62.9 |
| 3,353,261 | 11/1967 | Bradford et al. | 179—100.2C |
| 3,411,202 | 11/1968 | Schwartz | 179—100.2C |
| 3,412,217 | 11/1968 | Bygdnes | 179—100.2C |

OTHER REFERENCES

J. E. Burke (Ed.): Progress In Ceramic Science, vol. 3, The MacMillan Company, 1963, pp. 232–233 and 240–245.

J. E. Burke (Ed.): Progress In Ceramic Science, vol. 4, Pergamon Press, New York, 1963, pp. 96–101.

I. E. Campbell (Ed.): High-Temperature Technology, 1956, John Wiley & Sons, Inc., New York, pp. 236–245.

JULIUS FROME, Primary Examiner

J. H. MILLER, Assistant Examiner

U.S. Cl. X.R.

179—100.2; 252—62.56; 264—125, 320, 332